Jan. 6, 1970 G. R. UTTING 3,488,497
LIQUID SCINTILLATION COUNTING APPARATUS
Filed Oct. 22, 1965 3 Sheets-Sheet 2
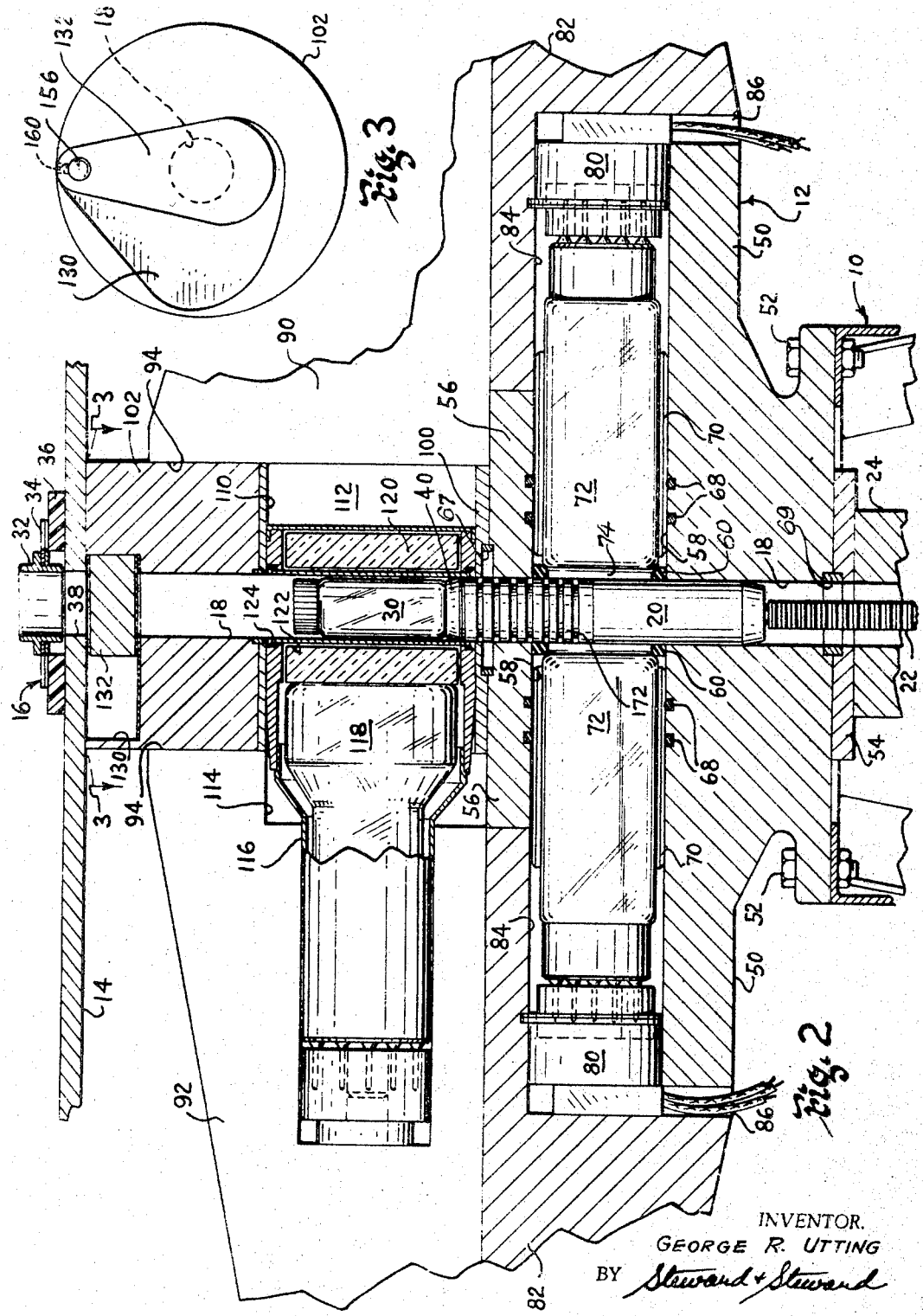
INVENTOR.
GEORGE R. UTTING
BY Steward + Steward
his ATTORNEYS

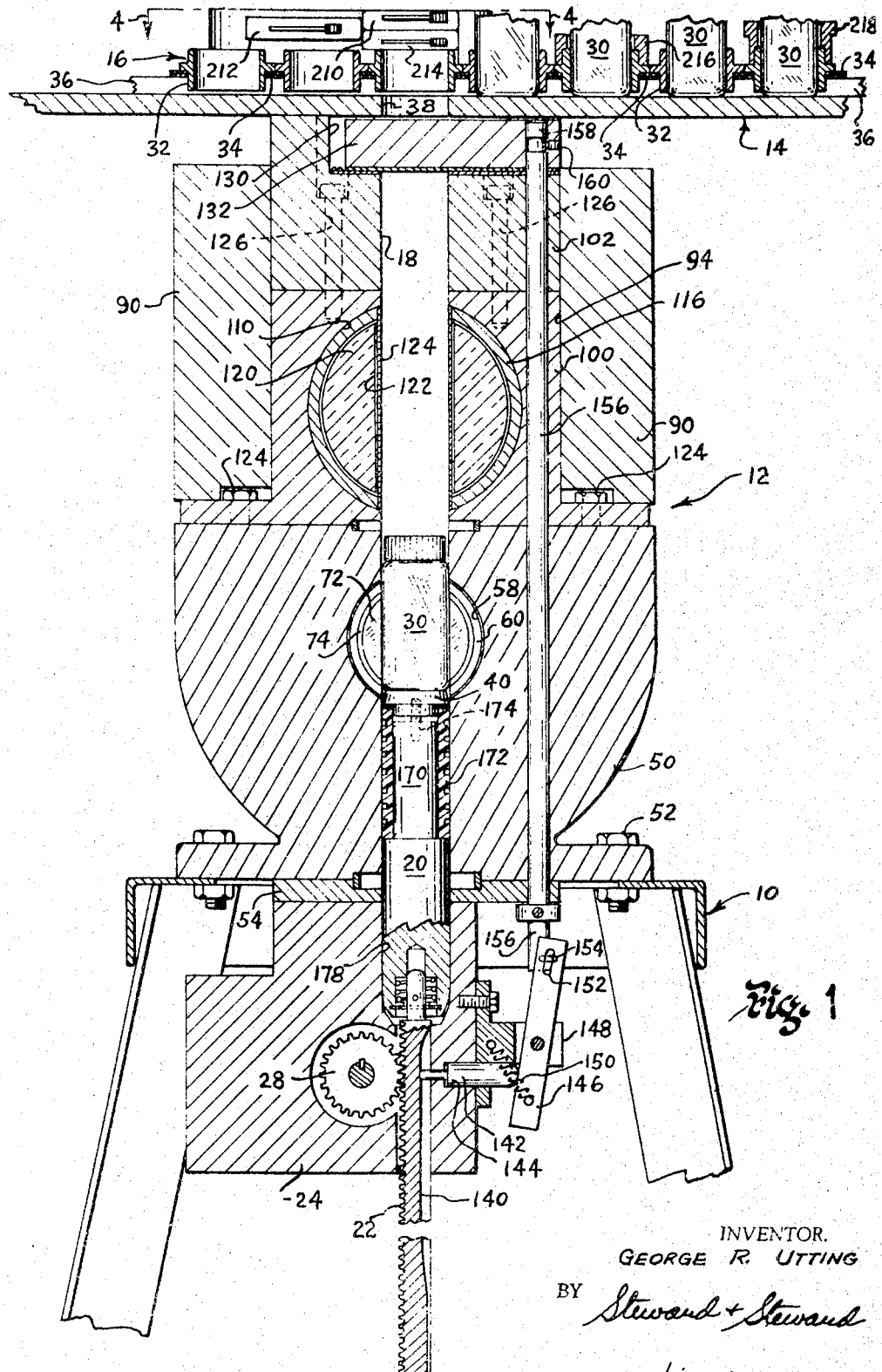

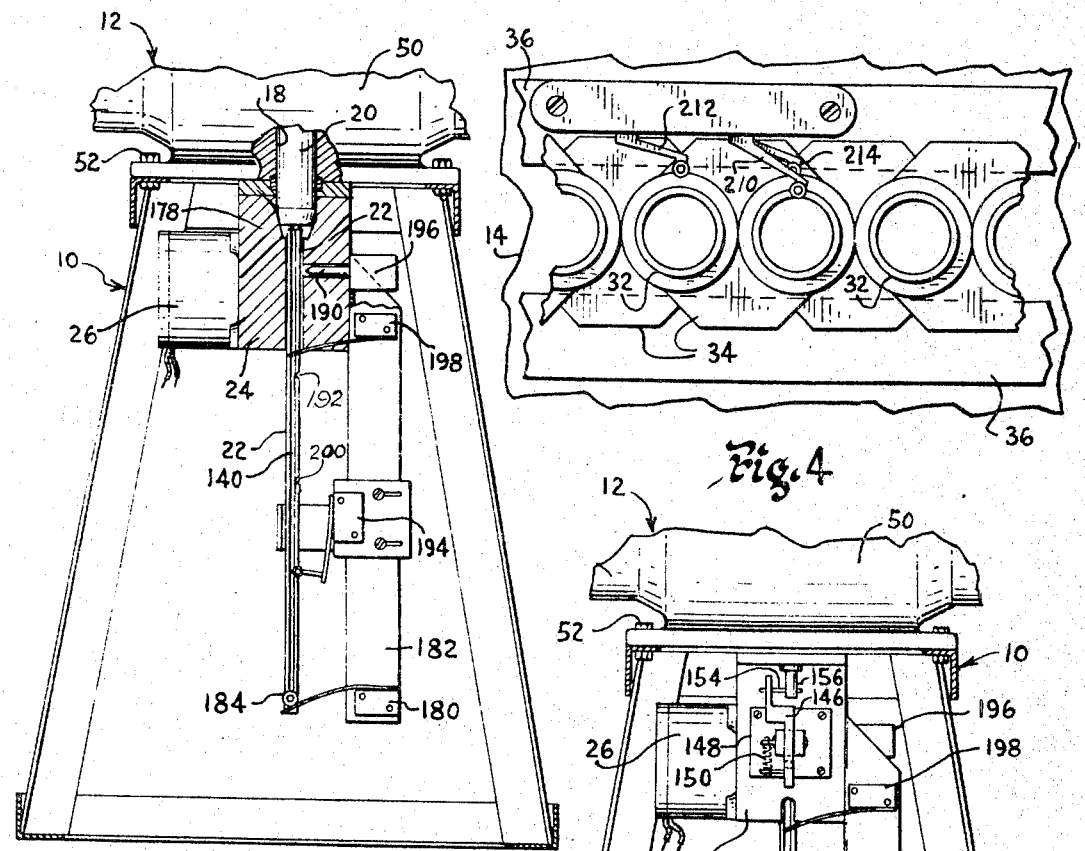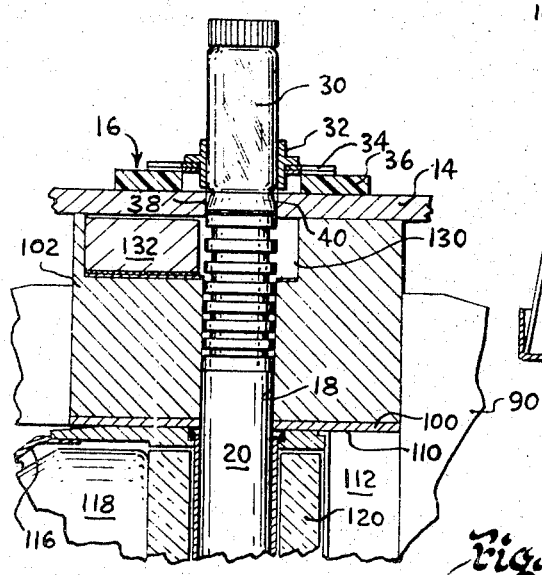

United States Patent Office 3,488,497
Patented Jan. 6, 1970

3,488,497
LIQUID SCINTILLATION COUNTING APPARATUS
George R. Utting, Guilford, Conn., assignor, by mesne assignments, to Picker Corporation, White Plains, N.Y., a corporation of New York
Filed Oct. 22, 1965, Ser. No. 501,646
Int. Cl. G01t *1/20;* H01j *39/18*
U.S. Cl. 250—71.5                    7 Claims

ABSTRACT OF THE DISCLOSURE

An apparatus for testing a plurality of liquid radioactive samples contained in uniform sample vials, wherein the samples are advanced seriatim by a conveyor to a location where they are temporarily diverted, tested for at least two different types of radioactivity, one of which is by liquid scintillation techniques, and returned to their respective seriatim positions on the conveyor; and a method of so-testing such samples.

---

This invention relates to apparatus for handling a plurality of generally similarly prepared samples of material to facilitate and simplify the repetitive operations involved in testing, reading and recording pertinent information about the characteristics thereof and effecting the incidental operations of sample handling involved therein, all in automatic fashion. The invention is more especially directed to liquid scintillation counting wherein apparatus is provided for counting several different types of radioactivity in liquid samples in a single sample handling machine.

The use of radioactive isotopes as tracers to study chemical and physical substances, and transitions or modifications occurring in such substances, is well known. Since organic chemistry is based on carbon, the radioactive isotope carbon-14 is one of the most important "tools" employed in biological measurements, while tritium or hydrogen-3 is particularly useful in tracing of water in various organisms or from various sources. Carbon-14 emits a beta particle of 155 kilovolts maximum energy, while tritium emits an extremely soft particle of 18 kilovolts. Because of the soft nature of radiation from both of these isotopes, self-absorption when counted by many of the conventional methods of radioactivity determination presents a great problem. In recent years, liquid scintillation counters have been developed for the specific purpose of counting such soft beta radiation. The principle of liquid scintillation counting is based on the use of a liquid scintillator, such as a solution of p-terphenyl in toluene, into which the radioactive sample is then introduced. The beta particle interacts with the liquid scintillator causing light emanations, and since the liquid in the sample container is transparent or translucent, the light pulses or emanations can be counted and/or measured by means of photomultiplier tubes. This system has now developed into a preferred method of counting in the biological field.

Since the liquid scintillators are relatively inefficient for gamma counting, and since beta emissions will also cause a count if present in the same sample, it has been standard practice for many years to use separate instruments for counting beta and gamma emitting isotopes. It is one of the principal objects of the present invention, however, to provide radiation detecting apparatus which is adapted to count more than one type of radiation efficiently in one machine or unit. Thus it is a purpose of the invention to provide automatic apparatus which incorporates separate radiation detection means and to advance, seriatim, the samples undergoing test to present them to independent test stations for the determination of different radiation characteristics at such stations. This arrangement makes possible the use of much of the same sample-handling mechanism as well as much of the same supporting electronic read-out and recording equipment for both tests, and accordingly effects substantial economy in equipment investment. It also provides substantially improved economy in respect of time required for handling a given number of samples, since the arrangement eliminates much of the duplication in handling the samples that is involved in prior conventional equipment.

In general terms, the apparatus specifically described and illustrated herein is adapted for counting both gamma emitting isotopes and beta emitting isotopes in liquid samples contained in standard transparent or translucent sample vials. In the automatic sample changer here described, the sample vials are arranged on a liner conveyor which positions them, seriatim, adjacent one end of the radiation and light shielded passage. Each sample vial is then moved to a first counting position or station enclosed in suitable shielded housing means wherein one type of radiation is detected and recorded, after which the sample vial is then moved along a linear path to a second counting position where a different type of radiation is recorded. That sample is then returned to its initial position in respect to the original group of samples, and the cycle is repeated as to each in the group to be tested.

A presently preferred form of the invention makes use of a "side hole" type of scintillation detection crystal in counting gamma radiations, which provides advantages over the "well" type of crystal used conventionally heretofore, more particularly in that it is less "sample-volume-dependent" than systems using a well type crystal. However the equipment here disclosed can be adapted for use with a well crystal.

Various objects and advantages of the invention are illustrated by the preferred embodiment of the invention specifically appearing in the accompanying drawings and described in detail hereinafter.

In the drawing:

FIG. 1 is a central vertical section through a sample testing apparatus embodying the invention, certain parts being omitted or broken away for greater clarity of illustration;

FIG. 2 is another fragmentary view in vertical section through the apparatus, as viewed at right angles to the illustration in FIG. 1;

FIG. 3 is a fragmentary view in plan, taken along line 3—3 of FIG. 2;

FIG. 4 is also a fragmentary view in plan, taken along line 4—4 in FIG. 1;

FIG. 5 is an end elevational view of the lower portion of the apparatus, as seen in FIG. 1, with parts broken away and in section to show the sample elevator positioning lock;

FIG. 6 is a view similar to FIG. 5 but from the opposite side, showing elevator limit switches and shutter actuating linkage; and FIG. 7 is a fragmentary sectional view in side elevation of portions of the apparatus in different position from that shown in FIGS. 1 and 2.

The embodiment of the invention illustrated in the drawings comprises, in general, a standard or base 10 upon which is supported a composite, i.e. multiple section, radiation shield, collectively designated as housing 12. This housing in turn supports a conveyor platform 14 and associated sample conveyor means 16. The composite radiation shield 12 members surround and define a vertical bore or passage 18 within which there is located a sample transport 20. The transport here takes the form of a piston or plunger which is vertically reciprocable in bore 18, and is movable in a linear direction along the bore to advance a sample seriatim to test stations, two such stations being incorporated in the apparatus here described. Reciprocation of the transport is effected by a gear rack 22 received in a housing or bearing block 24 and connected at its upper end to transport 20. Bearing block 24 is suspended at the under side of housing 12, together with a motor 26 and driving pinion 28 for effecting reciprocation of rack 22 and associated sample transport 20.

Samples of the radioactive material to be tested are placed in standard glass vials 30 and inserted in open-ended cups or sleeves 32 of conveyor 16, coming to rest upon plate 14 and slidable therealong as the conveyor is advanced. Sleeves 32 are interlinked by plates 34 to form an endless conveyor element disposed in serpentine fashion above plate 14, as defined by parallel tracks 36 secured to the upper face of the plate. A motor (not shown) is employed to advance conveyor 16 step-by-step past a loading station provided by aperture 38 in plate 14. Advance of a sample vial 30 into registry with aperture 38 is timed with the positioning of a sample transport 20 within aperture 38 at the point where the upper end 40 of the transport forms a substantially smooth continuation of the surface of plate 14, as seen in FIG. 7. Upon arrival of a sample at the loading station, the transport is lowered in bore 18 to carry the sample vial 30 to first and second testing stations spaced along bore 18 intermediate its ends. The first test station in the direction of descent is here illustrated as one for counting gamma ray emission; the lower station here illustrated is for beta ray detection. Sample transport 20 is moved by motor 26 to position the sample vial 30 opposite each of these stations for a predetermined period of time, or until a predetermined total count has been registered under the control of conventional recording means not here shown, after which the sample is returned to its starting position, being reinserted from below into its respective sleeve 32 of conveyor 16. The conveyor is then advanced one step to bring the next sample into position for engagement with transport 20 and the cycle repeated.

A more detailed description of the various components of the apparatus will now be given.

The composite housing 12 consists of a number of heavy metal castings stacked vertically, each having a central bore which, in the stacked arrangement, register to form a columnar passage 18 previously referred to. The base element 50 of housing 12 is heavy cast iron or the like and is secured by suitable fastening means 52 to the upper surface of standard 10. Base element 50, as best seen in FIG. 2, may be roughly referred to as of anvil configuration, having an upstanding boss or central portion 56 located symmetrically of the central vertical axis of the base element. Base element 50 also has a central vertical bore whose inner surface constitutes a lower portion of the vertical passage 18 of the apparatus.

Base element 50 is further provided with a horizontal bore 58 which intersects vertical passage 18, as seen in FIG. 2, and passes completely through the housing. Bore 58 forms apertures in boss 56 at either side of vertical passage 18, and the respective light-receiving ends of a pair of photomultiplier tubes 72 are received in these apertures, in face-to-face relation, the tubes being positioned by a bezel 60 so that the end faces of the tubes are in closely spaced juxtaposition to the wall of passage 18 on either side thereof. The end faces of tubes 72 and the surrounding wall of bore 58 thus define a chamber 74 constituting a test station.

It is most important that no extraneous light reach the photomultiplier tube in this type of apparatus. Various light seals are provided, therefore, to make sure that no light source, other than the scintillations of the samples undergoing test, can gain access to this test station, i.e. chamber 74. These light seals include sleeves 70 which surround the glass envelopes of tubes 72 to fill up the space between the tubes and the walls of bore 58 as well as protecting the tubes from damage during insertion or removal. In addition there are a plurality of O-rings 68 received in suitable grooves milled into the periphery of bore 58, which O-rings engage sleeves 70 at longitudinally spaced points on their peripheries. Other seals 67, 69 are likewise received in recesses surrounding passage 18 at the upper and lower faces of base shielding element 50. Black opaque tape is also generally placed over sleeves 70 and over the photomultiplier tube bases and sockets to complete the light seal around the tubes.

Each of the photomultiplier tubes 72 is mounted in a socket 80, and the shielding about the bases of tubes 72 is completed by identical cast lead segments 82 which rest on and are keyed to the apparatus on either side of the central boss 56, complementing base element 50 to complete the lower portion of the housing. See FIG. 2. The complementing shielding elements 82, 82, have recesses 84 which accommodate the tube sockets 80 and tube bases, while shielding base 50 is provided with channels 86 at each end to give access to the sockets for the necessary electrical leads from the tubes.

The housing of the beta counting position, i.e. chamber 74, just described constitutes the support for an additional shielding section for a second test station or gamma counting position as here illustrated. The shielding for the gamma position is superimposed directly upon base shielding members 50, 82, 82, and comprises a lead casting having a generally cylindrical hub portion 90 and an integral frusto conical wing section 92 extending laterally of the hub. The hub is formed with a vertical bore 94 to receive and surround superimposed central sections 100, 102 forming the gamma station housing and light shield housing, respectively. Section 100 is bolted, as at 124, to base 50 and section 102 is bolted, as at 126, to section 100. Shielding 90, 92, by reason of its weight and the encirclement of housing members 100, 102, merely sits on the apparatus and is retained in place simply by gravity. If desired to facilitate the assembly of the shield 90, 92 to the apparatus without removing conveyor platform 14, the shielding is split along a central vertical plane into two halves which permits them to be inserted between base 50 and platform 14.

The lower central section 100 of the gamma chamber housing is bored horizontally, as at 110, forming a cylindrical chamber 112 which is closed at one end by shielding segment 90. At the opposite end, chamber 112 communicates with a stepped recess 114 formed in the frusto conical portion 92, for the reception therein of an integral assembly consisting of a light-tight aluminum housing 116 enclosing a photomultiplier tube 118 and scintillation crystal 120, as for example an activated sodium iodide crystal, which is cylindrical in form. The scintillation crystal employed in this instance is of the side hole type, in that a hole 122 is bored diametrically through the crystal, from one side to the other, perpendicular to the cylindrical axis of the crystal. The hole is lined with an aluminum sleeve 124 forming part of the integral tube and crystal housing assembly. Within this housing, the face of tube 118 is held against an axial end of the crystal 120, in position to detect scintillations produced in the crystal when a gamma-emitting sample is stationed in the confines of chamber 112.

Each of the housing members 100, 102 is likewise formed with a central vertical bore, which bores, as previously mentioned, are aligned and in registry with the bore in base 50 to form segments of columnar passage 18 through which the sample is lowered and raised during a test cycle. Housing member 102 is also provided in its upper surface with a generally triangular recess 130 into which passage 18 opens at its upper end. A shutter 132 is disposed within recess 130 and is pivoted therein between alternate positions in one of which it overlies the upper end of passage 18, thereby blocking off admission of external light and radiation, and a second position in which it is disposed to one side of the passage, thereby giving access for the introduction or return of a sample.

Shutter 132 overlies the upper end of passage 18 at all times except for the brief intervals during which a sample vial 30 is being introduced into and expelled from the passage. This prevents the entry of light into the upper end of passage 18 except during such intervals, and during those intervals transport 20 itself, which is then positioned in the upper end of the passage, serves as the blocking means. The timing of the actuation of shutter 132 with the arrival and departure of transport 20 in the upper end of passage 18 is accomplished in the following manner.

Referring to FIGS. 1 and 6, it will be noted that gear rack 22 is formed on its rear surface with a cam slot 140, with the deepest portion of the slot being located immediately adjacent the upper end of the rack where it is attached to actuator 20. A cam follower 142 is slidably received in a suitable bore 144 in motor block 24, and the nose of follower 142 makes contact with the bottom of the cam slot 140. The back end of follower 142 engages a lever 146 which is pivotally supported on a bracket 148 on motor block 24. A spring 150 biases the lower end of lever 146 into contact with cam follower 142, thus urging the follower against the cam surface 140.

The upper end of lever 146 is provided with a slot 152 which receives a pin 154 fixed to and projecting radially from the lower end of a rod 156. This rod passes upwardly through suitably aligned apertures in a base pate 54 of housing 12, and housing components 50, 100 and 102, into an aperture 158 of shutter 132. The shutter is made fast with upper end of rod 156 by a set screw 160, and pivots with rotation of the rod.

In the position of transport 20 illustrated in FIG. 1, cam followers 142 is in its innermost position, relative to motor block 24, in which position shutter 132 is disposed over the upper end of passage 18, blocking the entrance to the passage. As transport 20 is raised, cam follower 142 is forced outwardly by the incline of the cam slot 140, thus pivoting lever 146 outwardly and causing rotation of rod 156 in a direction to move shutter 132 out of blocking position relative to passage 18. The contouring of cam slot 140 is such that shutter 132 is not swung out of its blocking position until the upper end 40 of transport 20 is at least above the top of chamber 74 to prevent the admission of light rays into the beta counting chamber when shutter 132 is thereafter moved to its non-blocking position. Since the photomultiplier tube 118 and crystal 120 are enclosed in an integral light-tight housing, admission of light to passage 18 at the level of the gamma counting station is of no consequence.

In order to further the light-blocking action of transport 20 in passage 18, this member is formed in its upper half with a section of reduced diameter constituting a boss 170. Around this boss is placed a black sleeve 172 of plastic, for example, whose outer periphery is serrated to provide axially spaced channels or grooves running circumferentially about the sleeve. The sleeve serves as and essentially friction-free, free-sliding light seal or labyrinth in conjunction with the side wall of the passage, and provindes a simple but very effective light seal which eliminates the need for friction-producing packing about the piston to obtain a good light seal or other more complex mechanical sealing arrangement. Sleeve 172 extends axially somewhat above boss 170 and is capped by the reflective end member 40 which is attached to the boss by a threaded stud 174.

In order to get accurate assay results it is necessary that the positioning of the test sample at the counting stations be very closely reproducible. For the beta count position, i.e. the positioning of sample vial 30 in chamber 74, the exact longitudinal positioning of the sample is assured in the construction illustrated by the bottoming of transport 20 within a recess 178 in motor block 24, as seen best in FIG. 1. A limit switch 180 (FIG. 6) mounted on a bracket 182 depending from bearing block 24 is actuated by a roller 184 secured to the lower end of rack 22 to interrupt power to motor 26 when this low-limit position is reached.

Accurate positioning of transport 20 at the gamma counting station, corresponding to the positioning of a sample vial 30 within the confines of chamber 112 as seen best in FIG. 2, is controlled by a spring actuated shot pin 190 mounted in motor block 24 laterally of rack 22, which pin engages a detent 192 (see FIG. 5) in the rack. As transport 20 approaches the position shown in FIG. 2, limit switch 194 (FIG. 6) is tripped, interrupting the driving circuit of motor 26 and de-energizing a solenoid 196 which holds pin 190 in retracted position against the spring bias. The pin is then free to move under the urging of the spring to bear against the side of rack 22. As rack 22 continues to move with coasting of motor 26, pin 190 drops into detent 192 and positively locks the rack and transport in accurately predetermined position. An added detent 200 is likewise provided in rack 22 for determining the upper limitation or "table" position of the carrier. Limit switch 198 is tripped by roller 184 of rack 22 upon arrival of the carrier at this position to interrupt the circuit of motor 26 and de-energize solenoid 196 to allow pin 190 to drop into detent 200.

Actuation of conveyor 16 for advancing the samples is controlled by a series of limit switches including switches 210, 212, 214 located above plate 14 and laterallp adjacent that run of the conveyor which passes over aperture 38 and the passage 18 subtending therefrom. A switch (not shown) is actuated upon the arrival of each sample vial 30 at aperture 38 in plate 14, whereupon transport 20 immediately begins to lower such sample into the several test positions as previously described. Should any of the sleeves 32 of conveyor 16 not contain a sample vial, a sample-actuated switch 210 is not tripped and the conveyor continues to run until the next sleeve 32 containing a vial is positioned above aperture 38.

Limit switches 212 and 214 are used in conjunction with collars 216, 218, respectively, which are metal or plastic rings that may be manually placed over any selected sample or samples in the group under test. Rings of different heights and external diameters are used so as to be contacted by and cause actuation of only that one of the several limit switches 212, 214 with which it is intended to cooperate. In this manner, recycling or stopping of the test may be controlled automatically to suit the particular needs of the counting operation.

What is claimed is:

1. The method of automatically testing in one apparatus a plurality of radioactive liquid scintillation samples for different types of radioactivity, which comprises
    advancing the plurality of sample stepwise in a first direction to position individual samples sequentially at a first position,
    advancing each sample individually from said first position along a linear path transverse to said first direction and extending between spaced radiation detecting stations, each of which stations is enclosed in radiation excluding shielding defining aligned passages disposed along said linear path,
    exposing each of said samples to test means provided at each of said radiation detecting stations seriatim, and then returning each sample to said first position for continued travel in said first direction.

2. Automatic testing apparatus for liquid scintillation counting of radioactive samples of material, comprising
    shielding means defining a laterally enclosed passage closed at one end and having a shutter movable into and out of blocking position relative to said passage and capable of excluding extraneous light, said shutter being spaced from said closed end of said passage;
    separate scintillation counting stations disposed in spaced relation along said passage within said shielding and including means at one of said stations responsive to beta radiations and means at another of said stations responsive to gamma radiations;

transport means located in said passage for receiving said samples one at a time at a receiving station and moving them past said shutter while in non-blocking position to position them temporarily at said spaced scintillation counting stations in sequence while a count is performed thereat;

means for moving said transport between said sample receiving and scintillation counting stations, including means operating said shutter in timed relation to said movement.

3. Automatic testing apparatus as defined in claim 2, wherein said gamma radiation counting station includes a scintillation crystal exposed during the gamma counting operation only to the sample temporarily positioned adjacent said scintillation crystal.

4. Automatic testing apparatus as defined in claim 3, wherein said scintillation crystal is of the side hole type and is positioned between said sample receiving and beta counting stations, whereby said samples and sample transport pass through the hole in said crystal in traveling to and from said beta counting station.

5. Automatic testing apparatus as defined in claim 4, wherein
said passage defined by said shielding means is vertically disposed and said samples are received at the upper end and are lowered through said gamma counting station to said beta counting station by said transport.

6. Sample testing apparatus as defined in claim 2, wherein said sample transport is a piston which is received in said passage and is formed in its periphery with a plurality of axially spaced encircling grooves each open onto the surrounding wall of said passage, said grooved portion of said transport being black and forming with said passage wall an essentially friction-free light-excluding labyrinth-like seal whereby said transport is freely slidable in said passage.

7. In apparatus for liquid scintillation testing of radioactive samples, an enclosed scintillation chamber having a columnar access opening for the admission thereto of a sample to be tested, transport means for moving such sample to and from said testing chamber through said access opening, light seal means carried by said transport, said seal forming a close but essentially friction-free sliding fit in said access opening blocking said opening when positioned therein, said seal member having a plurality of spaced encircling grooves in its periphery which grooves open on to the surrounding wall of said access opening, said grooved portion of said seal member being black and forming with the adjacent wall of said opening a light-excluding labyrinth-like seal.

References Cited

UNITED STATES PATENTS

| | | |
|---|---|---|
| 3,092,723 | 6/1963 | Payne et al. |
| 3,109,096 | 10/1963 | Spaa. |
| 3,114,835 | 12/1963 | Packard. |
| 3,283,151 | 11/1966 | Rowan et al. |
| 2,826,076 | 3/1958 | Boretz et al. _____ 250—106 |
| 3,246,156 | 4/1966 | Frank et al. _____ 250—106 |

ARCHIE R. BORCHELT, Primary Examiner

U.S. Cl. X.R.

250—106